United States Patent
Cortes Mac-Evoy

(10) Patent No.: US 12,001,201 B2
(45) Date of Patent: Jun. 4, 2024

(54) ESTIMATING A MECHANICAL DEGRADATION OF A MACHINE

(71) Applicant: Volkswagen Aktiengesellschaft, Wolfsburg (DE)

(72) Inventor: Carlos Cortes Mac-Evoy, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 17/355,400

(22) Filed: Jun. 23, 2021

(65) Prior Publication Data

US 2021/0402608 A1 Dec. 30, 2021

(30) Foreign Application Priority Data

Jun. 25, 2020 (EP) .................................... 20182392

(51) Int. Cl.
G05B 23/02 (2006.01)

(52) U.S. Cl.
CPC ..... G05B 23/0283 (2013.01); G05B 23/0221 (2013.01); G05B 2219/39466 (2013.01)

(58) Field of Classification Search
CPC .............. G05B 23/02; G05B 23/0221; G05B 23/0283; G05B 2219/39466; G06K 9/6218
See application file for complete search history.

(56) References Cited

U.S. PATENT DOCUMENTS

| | | | |
|---|---|---|---|
| 9,296,110 B2 * | 3/2016 | Drab | B25J 15/0028 |
| 2014/0039806 A1 | 2/2014 | Liao et al. | 702/34 |
| 2016/0091393 A1 | 3/2016 | Liao et al. | 702/34 |
| 2016/0334302 A1 | 11/2016 | Barikmo | 73/593 |
| 2019/0180527 A1 * | 6/2019 | Segal | G06N 20/00 |
| 2019/0369598 A1 * | 12/2019 | Kubo | G05B 19/4065 |
| 2020/0026262 A1 * | 1/2020 | Otsu | G06F 18/23 |

FOREIGN PATENT DOCUMENTS

| | | | | |
|---|---|---|---|---|
| CN | 105917207 A | 8/2016 | | G01M 13/02 |
| CN | 106885697 A | 6/2017 | | G01M 13/04 |
| CN | 108760266 A | 11/2018 | | G01M 13/00 |
| CN | 110717379 A | 1/2020 | | G06K 9/00 |
| EP | 3370125 A1 | 9/2018 | | G05B 19/042 |
| WO | WO-2018158404 A1 * | 9/2018 | | G05B 19/0421 |
| WO | 2019/077093 A1 | 4/2019 | | B63B 9/00 |

OTHER PUBLICATIONS

Extended European Search Report, Application No. 20182392.9, 8 pages, Dec. 11, 2020.
Chinese Office Action, Application No. 202110707865.1, 11 pages, Jan. 30, 2024.

* cited by examiner

*Primary Examiner* — Alvaro E Fortich
*Assistant Examiner* — Martin Walter Braunlich
(74) *Attorney, Agent, or Firm* — Slayden Grubert Beard PLLC

(57) ABSTRACT

A method for estimating a mechanical degradation of a machine comprises using a drive unit of the machine to move a movable component of the machine during an evaluation period. A drive parameter is measured during the evaluation period to set up a set of input data. A cluster analysis is performed by a processor on the input data and a degradation value for the machine is determined by the processor depending on a result of the cluster analysis.

14 Claims, 3 Drawing Sheets

ESTIMATING A MECHANICAL DEGRADATION OF A MACHINE

CROSS-REFERENCE TO RELATED APPLICATIONS

This application claims priority to European Patent Application No. EP20182392.9, filed on Jun. 25, 2020 with the European Patent Office. The contents of the aforesaid Patent Application are incorporated herein for all purposes.

TECHNICAL FIELD

The present invention relates to a method for estimating a mechanical degradation of a machine, the machine comprising a movable component and drive unit for controlling a motion of the movable component, wherein the drive unit is used to move the movable component during an evaluation period. The invention further relates to a system for estimating a mechanical degradation of a machine and to a computer program product.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The phenomenon of degradation of machines is of central importance, for example in condition based monitoring, CBM, or prognostics and health management, PHM, as it provides information in order to determine the current health status of a component or equipment and, therefore, to plan necessary actions for inspection or maintenance, aiming to improve the maintenance schedule, reduce maintenance costs and extend the lifetime of the systems and equipment.

Known approaches for the degradation estimation may be grouped in two families: first, the model based approaches, which attempt to reconstruct the dynamics of the deterioration by means of physical models, for example regarding crack growth, fatigue or wear dynamics. Given the mathematical and system's knowledge required to represent the physical degradation, the Wiener process is one of the most popular tools for modeling the deterioration of a system. Generally the physical models have a limited applicability due to the occurrence of multiple and non-linear degradation processes on the operating assets. The second family of approaches are the data-driven methods, which are based upon the system's collected historical data in order to construct a representation of the degradation. These approaches are in general directed to the degradation estimation of single components and focus on the deterioration estimation of systems and components than can be directly measured, for example bearings, turbofans, batteries, pumps and so forth.

However, the estimation of the degradation phenomenon of multiple components is much more challenging. In robotic grasping, for example, gripper systems are built using a significant amount of small components, such as spindles, small gearboxes, couplings, pulleys, tendons, and so forth in order to keep a certain equilibrium between performance and size, leading to a very limited amount of sensor data for building a representation of the degradation phenomenon. In order to ensure the execution of grasping tasks over extended periods of time in demanding scenarios without to access to maintenance, such as the outer space, deep sea or hazardous environments, the degradation states of the gripper systems have to be taken into account.

SUMMARY

An object exists to provide improved estimation of a mechanical degradation of a machine, which allows for a reliable degradation estimation also for machines that are subject to complex degradation processes and, e.g., which is not dependent on direct measurements of the degradation status of the machine's components.

This object is achieved by the respective subject-matter of the independent claims. Embodiments of the invention are discussed in the dependent claims and the following description.

DESCRIPTION

Figure 1:
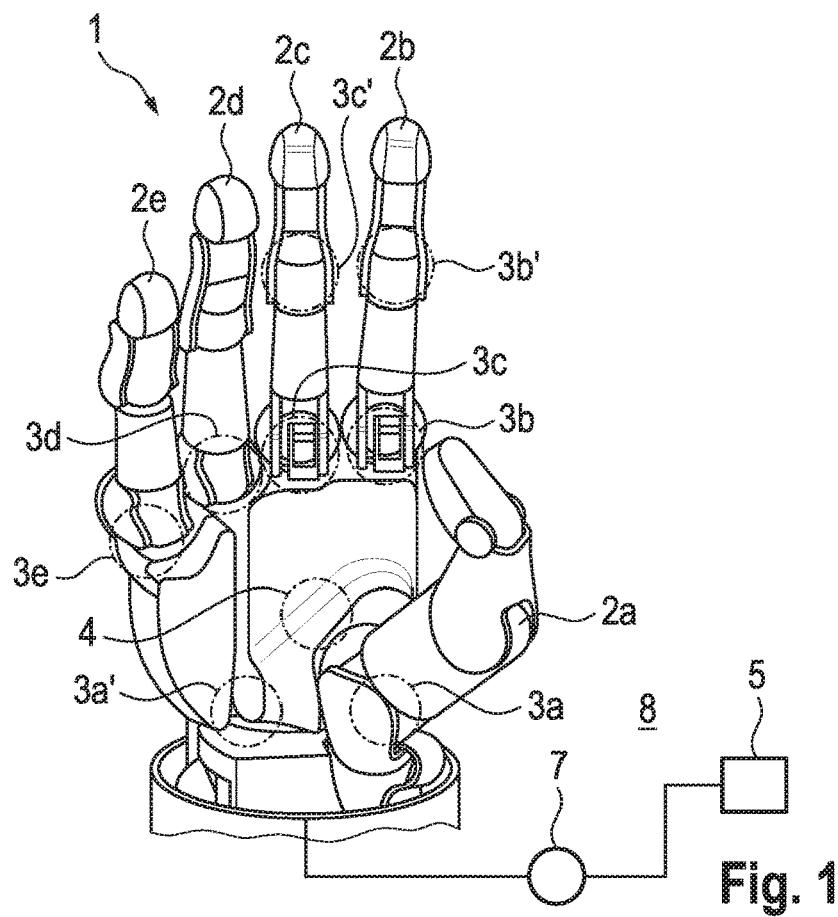
FIG. 1 shows schematically an exemplary embodiment of a system according to the teachings herein.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The present teachings are based on the idea to perform a cluster analysis based on a set of input data, which is generated depending on a drive parameter measured while the movable component is moved.

According to a first exemplary aspect, a method for estimating a mechanical degradation of a machine is provided. The machine comprises a movable component and a drive unit for controlling a motion of the movable component. The drive unit is used to move the movable component during an evaluation period. A set of input data is generated, e.g., by means of a sensor unit and a processor, wherein generating the set of input data comprises measuring a drive parameter of the drive unit, e.g., by the sensor unit, during the evaluation period. A cluster analysis is performed by the processor by applying a cluster analysis algorithm to the set of input data. A degradation value for the machine, for example for the movable component, is determined by the processor depending on a result of the cluster analysis.

The terms 'processor' and 'computing unit' are used interchangeably herein.

The movable component is, for example, movable by the drive unit with respect to further static or movable components of the machine.

The drive unit comprises, for example, a motor drive, for example an electric motor drive, a pneumatic or hydraulic drive. The motor drive comprises a drive motor, such as an electric drive motor.

Depending on the implementation and operation principle of the drive unit, the drive parameter may correspond to different physical parameters in some embodiments. For example, the drive parameter may be a parameter concerning the electrical drive current in case of an electric motor drive or a work medium, such as a pressure or flow of air or a liquid, in case of a pneumatic or hydraulic drive unit. The drive unit may also comprise a control unit, for example an H-bridge, which is configured to control a position and the electrical drive current in some embodiments.

The movement of the movable component during the evaluation period may for example be understood as a movement over at least a part of a predefined moving range of the movable component. Depending on the implementation of the machine and the movable component, the moving range may correspond to a one-dimensional parameter range, for example to a rotation angle or a position, or to a two-dimensional or higher-dimensional parameter space.

In some embodiments, the drive parameter may be measured during the evaluation period as a function of time, for example at a certain sampling rate.

The result of the cluster analysis may for example be understood as a description, such as a mathematical description, of at least two, for example at least three, clusters of points or vectors corresponding to the input data in a respective parameter space, which may for example include the drive parameter as a degree of freedom. Particularly good results have been achieved with five or six clusters in some embodiments. For example, the result of the cluster analysis may comprise centroid positions, variances or other statistical quantities of the respective clusters.

The degradation value is determined by the processor for example depending on respective descriptions of all clusters identified or defined by the cluster analysis. For example, the degradation value may be based on or correspond to a statistical quantity of the parameters describing the individual clusters. For example, a minimum distance between centroids of the clusters may correspond to or form a basis for the degradation value.

By means of the teachings herein, the cluster analysis based on the drive parameter may be used as an indirect means to extract information regarding an actual degradation status of the machine or the movable component, respectively. For example, the degradation value can be determined independent of several aspects related to the actual application or use of the machine. The inventors have realized that the actual status of the degradation leads to distinctive signatures in the drive parameter, which may be extracted by means of the cluster analysis. For example, an actual status of the movable component or a part of the movable component, such as individual bearings, gears or connections, do not have to be directly inspected or measured in order to estimate the degradation according to the teachings herein. In fact, the teachings herein do not rely on the identification of the specific type of degradation or the specific failure type which may have caused the degradation.

Therefore, the analysis may be highly automated and may, for example, also be applied to machines with a high degree of complexity and with a great number of individual movable components, which are subject to degradation processes.

In some embodiments, the cluster analysis algorithm is based on a machine learning model, for example an unsupervised learning model.

In some embodiments, the cluster analysis algorithm comprises a K-means algorithm.

For example, a parameter of the K-means algorithm corresponds to a predefined number of clusters and the K-means algorithm determines, after a certain number of iterations, which points of the input data correspond to which of the clusters and also the centroids of the clusters. The K-means algorithm has proven to be particularly efficient and suitable for extracting the degradation information from the measured values of the drive parameter. Furthermore, the K-means algorithm has the advantage that is does not require labeled training data.

In some embodiments, generating the input data comprises generating a set of raw data by the measurement of the drive parameter and generating a point cloud depending on the set of raw data by the processor.

For example, the input data may correspond to the point cloud. The point cloud may be a one-dimensional, a two-dimensional, a three-dimensional or an even higher-dimensional point cloud. One degree of freedom of the corresponding parameter space of the input data and the point cloud, respectively, may correspond to the drive parameter. The other degrees of freedom may, if applicable, correspond to one or more further drive parameters of the drive unit and/or to one or more kinematic parameters of the movable component, such as position or orientation of the movable component, or other measurable or derivable parameters.

In some embodiments, the set of raw data corresponds to the drive parameter as a function of time, such as a discrete function of time, and generating the input data comprises transforming the drive parameter from the time domain into a frequency domain by the processor, for example by applying a discrete Fourier transform. Each point of the point cloud comprises a value of the drive parameter in the time domain and a value of the transformed drive parameter in the frequency domain.

In this way, the drive parameter and its frequency content are used as parameters or features for the cluster analysis. It has been shown in tests and experiments that such sets of parameters are particularly well suited for extracting the degradation information in terms of the cluster analysis.

In some embodiments, a kinematic parameter of the movable component is measured during the evaluation period, such as by using a further sensor unit. Each point of the point cloud comprises a value of the drive parameter and a value of the kinematic parameter.

The kinematic parameter may, for example, correspond to a position parameter according to a corresponding degree of freedom of the movable component. In other words, the kinematic parameter may comprise or correspond to a translational position, a rotational position or a generalized position of the movable component or may be derived from them, for example by computing a respective time derivative or another function.

Depending on the actual implementation of the machine, it may be particularly simple to measure the kinematic parameter as a function of time in some embodiments. Then, it may be beneficial to use the combination of the drive parameter and the kinematic parameter for the cluster analysis. In this way, the computational step of performing the Fourier transform may be saved. However, also in such implementations, the drive parameter and the kinematic parameter may be given in the time domain or in the frequency domain, respectively.

In some embodiments, performing the cluster analysis comprises, by the processor, determining respective centroids for each of at least three clusters of the point cloud and determining a set of mutual distances between the centroids. The degradation value may be determined depending on the set of mutual distances.

For example, as described, the number of clusters may be predefined. The algorithm may determine all points of the point cloud corresponding to the respective clusters automatically and determine the centroids, which can be understood as the n-dimensional coordinates of the centroids in the respective n-dimensional parameter space, automatically.

For example, the set of mutual distances comprises a distance between a first cluster and a second cluster of the at least three clusters, a distance between the first cluster and a third cluster of the at least three clusters and a distance between the second and the third cluster. In case more than three clusters are predefined, the set of mutual distances comprises a respective distance for each pair of clusters.

The inventors have found out that, in case the degradation of the machine or the movable component is low or zero, the distance between the clusters' centroids is low. In other words, in case the movable component is "healthy", the points of the point cloud may be described well by a single cluster. However, as the movable component degrades over time, additional clusters are formed, whose distances increase over time. This phenomenon is exploited in such embodiments by taking into account the set of mutual distances for determining the degradation value. Consequently, the degradation value may be determined with a higher reliability.

In some embodiments, performing the cluster analysis comprises, by the processor, determining a statistical quantity of the set of mutual distances. The degradation value is determined depending on or as the statistical quantity. In this way, the evaluation and assessment of the degradation becomes particularly simple. For example, memory requirements for storing the degradation value over time may be decreased.

In some embodiments, the statistical quantity comprises a minimum value of the set of mutual distances.

It has been found in experiments that the minimum distance between the clusters is particularly suitable for determining the degradation value, since, as described above, the distances between the individual clusters increases with ongoing degradation of the movable component over time. Furthermore, it has been shown that the minimum value features a particularly high monotonicity and a particularly low volatility, which makes it a particularly well-suited descriptor for the degradation.

In some embodiments, the statistical quantity comprises a maximum value or a mean value or a variance value or a standard deviation value of the set of mutual distances.

Depending on the actual implementation of the machine and the movable component, these quantities are also suitable due to their relatively low volatility and relatively high monotonicity, as has been found in the experiments.

In some embodiments, the movement of the movable component during the evaluation period is carried out as a free movement and the drive parameter is measured during the free movement, for example exclusively during the free movement.

The free movement may be understood as a movement of the movable component without any external load been applied to the movable component. For example, if the movable component is designed to grasp an object or lift an object according to an application of the machine, the free movement corresponds to a movement, where the component is actually not lifting or grasping such an object. In other words, the movable component is brought into a load free status and then is moved within its allowed movement range during the evaluation period, such that the movable component is load free during the whole evaluation period.

In this way, it may be avoided that the load affects the measured drive parameter of the drive unit during the evaluation period. Therefore, the measured drive parameter remains comparable over time, for example over several evaluation periods. In consequence, the degradation value and, for example, its evolution over time may be determined with a higher accuracy and reliability.

In some embodiments, the machine comprises a gripping unit and the movement of the movable component is carried out as a gripping movement.

For example, the machine may be implemented as or comprise a robotic hand device, for example an anthropomorphic robotic hand device, which may for example be electrically drivable.

The experiments of the inventors have revealed that the teachings herein deliver a particularly reliable and meaningful assessment of the degradation for such devices.

The movable component may, in case of an anthropomorphic robotic hand device, for example correspond to a finger or a thumb or a part thereof.

In some embodiments, the drive parameter corresponds to an electric supply current of an electric motor of the drive unit.

In some embodiments, the drive parameter comprises a fluid pressure or a fluid flow rate of a pneumatic or hydraulic unit of the drive unit.

The fluid flow rate may be understood as a volume or mass of a respective work fluid, such as air, another gas, water or oil, per time unit and per cross-section area.

According to a second exemplary aspect, a system for estimating a mechanical degradation of a machine with a movable component is provided. The system comprises a drive unit, which is configured to control a motion of the movable component and to move the movable component during an evaluation period. The system comprises a sensor unit, which is configured to measure a drive parameter of the drive unit during the evaluation period. The system comprises a processor, which is configured to generate a set of input data depending on the drive parameter measured during the evaluation period, perform a cluster analysis by applying a cluster analysis algorithm to the set of input data and to determine a degradation value of the machine depending on a result of the cluster analysis.

The machine and/or the movable component are not necessarily parts of the system for estimating the mechanical degradation. However, in some embodiments, the system according to the teachings herein comprises the movable component and/or comprises the machine.

In some embodiments, the system for estimating mechanical degradation comprises the machine and the machine comprises the drive unit.

In some embodiments, the system comprises the machine and the machine comprises a gripping unit.

In some embodiments, the drive unit comprises an electric motor and the drive parameter corresponds to an electric supply current of the electric motor.

In some embodiments, the drive unit comprises a pneumatic or hydraulic unit and the drive parameter comprises fluid flow rate of the pneumatic or hydraulic unit.

Further embodiments of the system according to the second aspect follow directly from the various embodiments of the method of the first aspect and vice versa. For example, a system according to the second aspect or its embodiments may be configured to or programmed to carry out the method according to the first aspect or its embodiments or the system carries out such a method.

According to a third exemplary aspect, a computer program comprising instructions is provided. When the instructions are executed by a system according to the second aspect or its embodiments, for example by the processor of the system, the instructions cause the system to carry out the method according to the first aspect or its embodiments.

According to a further exemplary aspect, a computer readable storage medium storing a computer program is provided.

The computer program and the computer readable storage medium may also be denoted as respective computer program products comprising the instructions.

In the following, the invention will be explained in further detail with reference to further specific exemplary embodiments and respective schematic drawings. In the drawings, identical or functionally identical or similar elements may be denoted by the same reference signs. The description of identical or functionally identical or similar elements is not necessarily repeated with respect to different figures.

Specific references to components, process steps, and other elements are not intended to be limiting. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

In FIG. 1, an exemplary embodiment of a system 8 for estimating a mechanical degradation of a machine 1 is shown.

The system 8 comprises a processor 5 and a sensor unit 7 coupled to the machine 1. The machine 1 comprises a plurality of movable components 2a, 2b, 2c, 2d, 2e and at least one drive unit 3a, 3a', 3b, 3b', 3c, 3c', 3d, 3e, 4 for each of the movable components 2a, 2b, 2c, 2d, 2e. The machine 1 may, in some embodiments, comprise additional or less drive units as shown in the figures.

In the present example, each of the drive units 3a, 3a', 3b, 3b', 3c, 3c', 3d, 3e, 4 comprises a respective actuator to move the corresponding movable components 2a, 2b, 2c, 2d, 2e or a part of it. The machine 1 has for example one or more electrically driven motors to control the actuators. In other words, each of the drive units 3a, 3a', 3b, 3b', 3c, 3c', 3d, 3e, 4 is associated to a respective electric motor, which is configured to control the motion of the respective actuator. The sensor unit 7 is configured to measure the motor current of the electric motor as a function of time for each of the drive units 3a, 3a', 3b, 3b', 3c, 3c', 3d, 3e, 4. In some embodiments, each of the drive units 3a, 3a', 3b, 3b', 3c, 3c', 3d, 3e, 4 comprises an associated electric drive motor and the sensor unit 7 is configured to measure the corresponding electric currents of each motor.

The machine 1 may also comprise a further sensor system (not shown) to measure the respective positions of the movable components 2a, 2b, 2c, 2d, 2e. For example, the further sensor system may comprise respective motor encoders for the electric motors to determine the respective positions of the components 2a, 2b, 2c, 2d, 2e.

The machine 1 may for example be controlled by the processor 5 or by a further computing unit or processor(not shown) to move one or more of the movable components 2a, 2b, 2c, 2d, 2e in a load free status during a respective evaluation period and the sensor unit 7 measures the respective motor currents during the evaluation periods. For one or more of the movable components 2a, 2b, 2c, 2d, 2e, the processor 5 generates a respective set of input data depending on the respective motor current measured during the evaluation period. The processor 5 performs a cluster analysis by applying a cluster analysis algorithm to each of the sets of input data and determines a degradation value for the machine 1 or, respectively, the corresponding movable component 2a, 2b, 2c, 2d, 2e or a part of it depending on a result of the cluster analysis.

Figure 2:
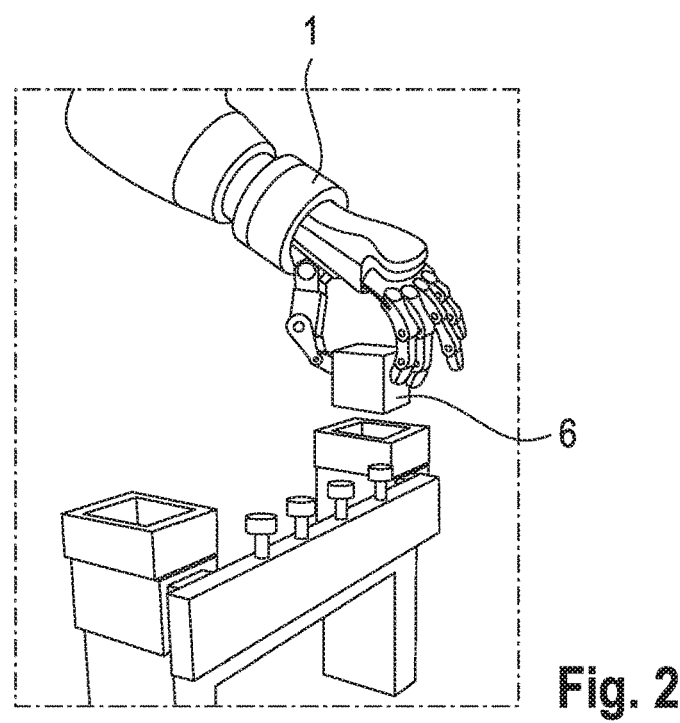
FIG. 2 shows schematically a further exemplary embodiment of a system according to the teachings herein.

In the following, further details are discussed with respect to a concrete example for the machine 1 under consideration, namely for the machine 1 corresponding to an anthropomorphic hand 1 as indicated in FIG. 1. FIG. 2 shows the hand 1 grasping a test object 6. It is pointed out that this exemplary choice of the machine 1 does in general not restrict the applicability of the teachings herein.

The anthropomorphic hand 1 is able to provide sensor data in terms of joint angular positions and motor currents. Such hands 1 are commercially available in June 2020 for example from Schunk GmbH & Co. KG. The hand 1 is driven by nine motors actuating at least nine joints by means of leadscrew mechanisms that convert prismatic motion into rotational motion. For example, each of the motors may be part of one of the drive units 3a, 3a', 3b, 3b', 3c, 3c', 3d, 3e, 4. The movable components 2a, 2b, 2c, 2d, 2e correspond to a thumb 2a, an index finger 2b, a middle finger 2c, a ring finger 2d and a little finger 2e.

The hand 1 may be controlled by a position controller (not shown) and a current controller (not shown) working in cascade that are interfaced via a driver (not shown) compatible with the known Robot Operating System ROS. Grasping may be performed by a grasp controller (not shown) actuating in motor space based on the motor torque measurements and therefore, it is possible to determine the enclosure of an object.

In the following, an exemplary embodiment of the method is discussed with respect to FIG. 3 to FIG. 6, wherein the hand 1 is considered as a non-limiting example for the machine 1.

Figure 3:
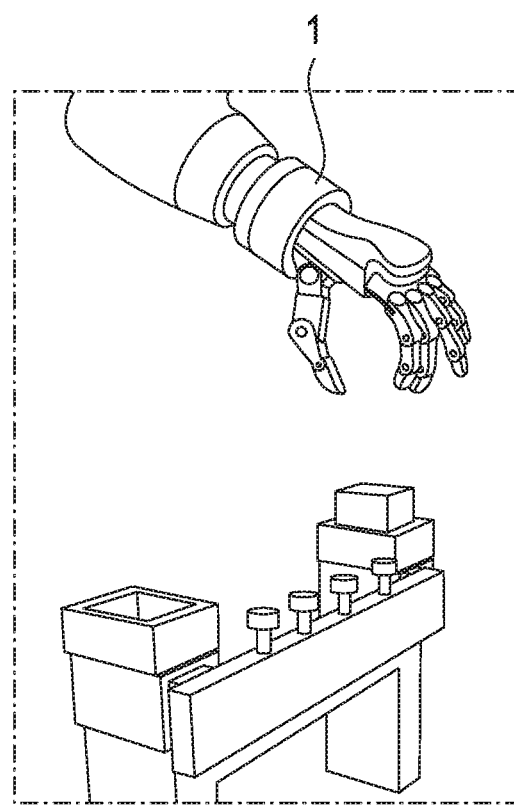
FIG. 3 shows schematically a method step of an exemplary embodiment of a method according to the teachings herein.

In a method step represented by FIG. 3, the hand 1 is set to perform a free movement on a regular basis, for example once a day during ten minutes. During this time, both the motor current signals of the drive units 3a, 3a', 3b, 3b', 3c, 3c', 3d, 3e, 4 as well as the corresponding positions are recorded, for example using ROS at a frequency of 100 Hz, and afterwards stored on a local database (not shown). The free movement may for example be chosen as a free open-close movement across the mechanical movement range of all the components 2a, 2b, 2c, 2d, 2e of the hand 1 in order to isolate it from external disturbances and loads and have a better picture of the actual system's behavior. Otherwise, the measurements could be influenced by the effects of the loads, disturbances and other phenomena like heat transfer, deformation and so forth.

Figure 4:
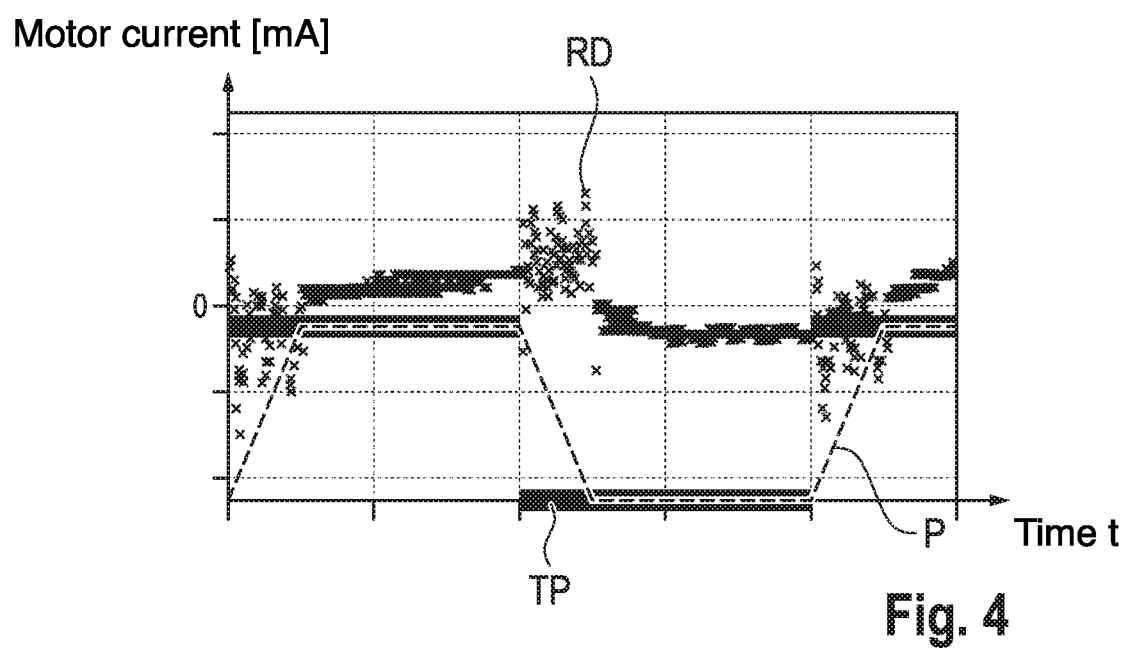
FIG. 4 shows schematically a further method step of an exemplary embodiment of a method according to the teachings herein.

FIG. 4 shows schematically the angular position P and its corresponding motor current signal RD for a specific finger as well as the corresponding target position TP. The motor current signal RD as a function of time may be considered as raw data. In an experiment, the aforementioned measurements have been conducted for more than 50 days, leading to a dataset size of about 27 million records.

On healthy fingers, the motor current is mostly concentrated on a whole single data unit or cluster across the corresponding mechanical movement range in absence of loads (grasping). However, as the fingers degrade over time, it is observed that their associated motor currents begin to split and form additional clusters, whose distance increases over time. The motors of the fingers of the hand 1 may exhibit the same dynamic behavior during free motion under healthy conditions. When they are traveling to the closed position (fist), the motor currents may be negative, while they may be positive when traveling back. For healthy fingers, the distance between these clusters is small.

Figure 5:
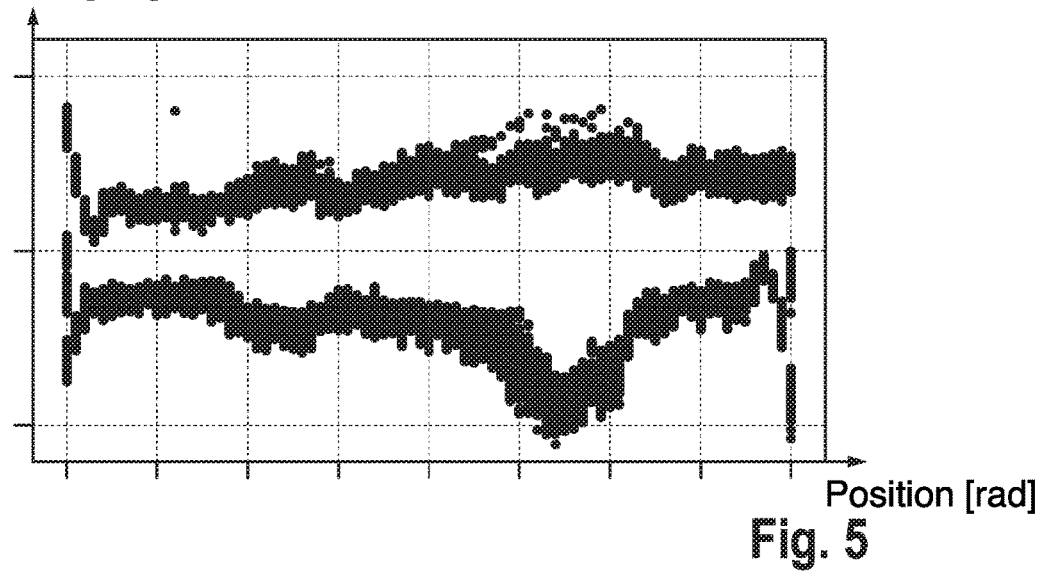
FIG. 5 shows schematically a further method step of an exemplary embodiment of a method according to the teachings herein.

Based on the previous observation, an unsupervised learning model based on K-means may be trained to analyze the evolution of the clusters over time, as depicted schematically in FIG. 5, which depicts the distribution of the motor current of the drive unit 3b as a function of the corresponding angular position of the respective part of the index finger 2b. The angular positions, motor currents in the time domains and their corresponding values in the frequency domain may be used as features for the models forming a point cloud as input data for the model, since they revealed significant information about the degradation. Using the K-means algorithm, the processor 5 may determine the centroids of the clusters in the input data and based on the position of the centroids, computes the mutual Euclidean distances between them. A vector D containing all mutual distances between the cluster centroids across the entire database is set up. D is a real (k×p)-dimensional vector, wherein $p=n*(n-1)/2$, $n>2$ is a predefined number of clusters and $k=1, 2, \ldots, 53$ corresponds to the respective measurement instance. Several parameters, such as the sum, the minimum, the maximum, the mean value, the standard deviation as well as the area covered by the centroids may be were calculated by the processor 5 from vector D.

Figure 6:
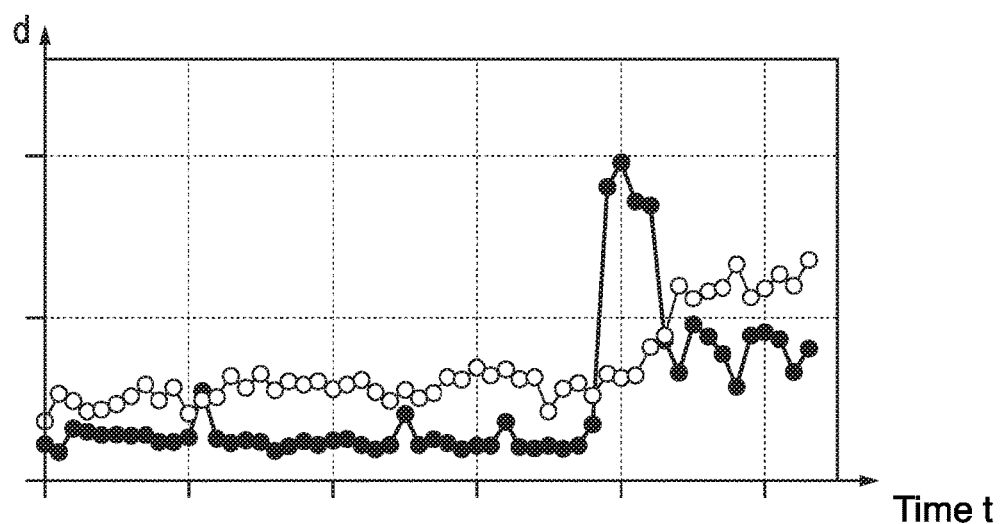
FIG. 6 shows schematically a further exemplary method step of an exemplary embodiment of a method according to the teachings herein.

A Spearman and volatility analysis revealed that the minimum distance between the clusters centroids for a given k exhibits a particularly monotonic behavior and very low volatility. Therefore, a degradation value d may be computed by the processor 5 for example as minimum value of D for fixed k. FIG. 6 shows the degradation value d as a function of k for the motor of drive unit 3a corresponding to a flexion movement of the thumb 2a as empty circles. The filled circles show d as a function of k for the motor of drive unit 3a' corresponding to an opposition movement of the thumb 2a.

As can be seen in FIG. 6, the estimated degradation values d for the thumb 2a were low for most of the time. However, during the course of the experiment, the hand 1 suffered a collision, which caused a crack on a structural screw hole of the hand 1. The degradation values d are consistent with the consequences of this failure as d increased significantly right after the occurrence of the failure event for the thumb opposition 3a'. Maintenance actions such as oiling may partially alleviate degraded situations, as also reflected in FIG. 6.

The teachings herein allow the online and offline detection of degradation phenomena maintaining a low complexity using real data from a real system. The approach does not necessarily require a large amount of data nor existing datasets for estimating the degradation.

The teachings herein may be used for anthropomorphic hands as described above but also for other types of robotic hands, gripper systems and generally for machines with one or more moveable components, which are driven by a drive unit with a measurable drive parameter such as the drive current in case of electric motors. In alternative embodiments, the air flow in pneumatically driven gripper systems may be used analogously as the motor currents in the description above.

LIST OF REFERENCE NUMERALS 1 machine, hand
2a, 2b, 2c, 2d, 2e movable components
3a, 3a', 3b, 3b', 3c, 3d, 3e drive units
4 drive unit
5 processor
6 test object
7 sensor unit
8 system
d degradation value
RD raw data
TP target position
P position The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for estimating a mechanical degradation of a machine, the machine comprising a movable component with a gripping unit having one or more fingers and/or a thumb and a drive unit for controlling a gripping movement of the movable component, comprising:
    moving the movable component by the drive unit during an evaluation period;
    generating a set of input data, wherein generating the set of input data comprises measuring at least one drive parameter of the drive unit during the evaluation period and generating a point cloud depending on the input data by the processor, wherein the at least one drive parameter comprises one or more of an electric supply current of an electric motor of the drive unit, and a fluid flow rate of a pneumatic or hydraulic unit of the drive unit;

performing a cluster analysis by a processor by applying a cluster analysis algorithm to the set of input data, wherein performing the cluster analysis comprises:

determining respective centroids for at least three clusters of the point cloud; and determining a set of mutual distances between the centroids;

the method further comprising:

determining a degradation value for the machine by the processor depending on the set of mutual distances.

2. The method of claim 1, wherein the cluster analysis algorithm comprises a K-means algorithm.

3. The method of claim 1, wherein generating the input data comprises generating a set of raw data by the measurement of the at least one drive parameter.

4. The method of claim 3, wherein the set of raw data corresponds to the at least one drive parameter as a function of time;

generating the input data comprises transforming the at least one drive parameter from the time domain into a frequency domain by the processor; and each point of the point cloud comprises a value of the at least one drive parameter in the time domain and a value of the transformed at least one drive parameter in the frequency domain.

5. The method of claim 3, wherein a kinematic parameter of the movable component is measured during the evaluation period;

each point of the point cloud comprises a value of the at least one drive parameter and a value of the kinematic parameter.

6. The method of claim 1, wherein performing the cluster analysis comprises determining a statistical quantity of the set of mutual distances; and the degradation value is determined depending on the statistical quantity.

7. The method of claim 6, wherein the statistical quantity comprises a minimum value or a maximum value or a mean value or a variance value or a standard deviation value of the set of mutual distances.

8. The method of claim 1, wherein the movement of the movable component during the evaluation period is carried out as a free movement and the at least one drive parameter is measured during the free movement.

9. A system for estimating a mechanical degradation of a machine with a movable component with a gripping unit having one or more fingers and/or a thumb, the system comprising:

a drive to control a gripping movement of the movable component and to move the movable component during an evaluation period;

a sensor to measure at least one drive parameter of the drive during the evaluation period, wherein the at least one drive parameter comprises one or more of an electric supply current of an electric motor of the drive unit, and a fluid flow rate of a pneumatic or hydraulic unit of the drive unit; and a processing circuit, configured to:

generate a set of input data depending on the at least one drive parameter measured during the evaluation period and generate a point cloud depending on the input data; and to perform a cluster analysis by applying a cluster analysis algorithm to the set of input data, wherein performing the cluster analysis comprises determining respective centroids for at least three clusters of the point cloud and determining a set of mutual distances between the centroids; wherein the processing circuit is further configured to:

determine a degradation value for the machine depending on the set of mutual distances.

10. The system of claim 9, wherein the system comprises the machine.

11. A non-transitory recording medium with instructions, which, when executed by a system for estimating a mechanical degradation of a machine with a movable component, causes the system to carry out the method of claim 1.

12. The method of claim 2, wherein generating the input data comprises generating a set of raw data by the measurement of the at least one drive parameter and generating a point cloud depending on the set of raw data by the processor.

13. The method of claim 2, wherein the movement of the movable component during the evaluation period is carried out as a free movement and the at least one drive parameter is measured during the free movement.

14. The method of claim 3, wherein the movement of the movable component during the evaluation period is carried out as a free movement and the at least one drive parameter is measured during the free movement.

* * * * *